United States Patent
Diienno

(10) Patent No.: US 11,762,954 B2
(45) Date of Patent: Sep. 19, 2023

(54) UNKNOWN OBJECT CLASSIFICATION THROUGH SIGNAL TRANSFORM SET

(71) Applicant: The Government of the United States, as represented by the Secretary of the Army, Washington, DC (US)

(72) Inventor: Robert Diienno, Avondale, PA (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 66 days.

(21) Appl. No.: 16/928,280

(22) Filed: Jul. 14, 2020

(65) Prior Publication Data

US 2022/0019787 A1    Jan. 20, 2022

(51) Int. Cl.
| | | |
|---|---|---|
| G06F 18/241 | (2023.01) | |
| G06F 17/14 | (2006.01) | |
| G06V 10/75 | (2022.01) | |
| G06V 10/764 | (2022.01) | |
| G06V 10/42 | (2022.01) | |
| G06N 3/08 | (2023.01) | |
| G06V 10/82 | (2022.01) | |

(52) U.S. Cl.
CPC .......... *G06F 18/241* (2023.01); *G06F 17/147* (2013.01); *G06V 10/431* (2022.01); *G06V 10/751* (2022.01); *G06V 10/764* (2022.01); *G06F 2218/12* (2023.01); *G06N 3/08* (2013.01); *G06V 10/82* (2022.01)

(58) Field of Classification Search
CPC ............. G06K 9/00536; G06K 9/6202; G06K 9/6268; G06F 17/147; G06F 18/241; G06F 2218/12; G06V 10/751; G06V 10/431; G06V 10/764; G06V 10/82; G06N 3/08

See application file for complete search history.

(56) References Cited

U.S. PATENT DOCUMENTS

| | | | | |
|---|---|---|---|---|
| 10,019,506 | B1 * | 7/2018 | Li .......................... | G06K 9/6892 |
| 10,861,164 | B1 * | 12/2020 | Mishra ...................... | G06T 7/20 |
| 10,953,850 | B1 * | 3/2021 | Pertsel .................... | G06N 20/00 |
| 2005/0002561 | A1 * | 1/2005 | Monachino ...... | G08B 13/19641 |
| | | | | 382/159 |
| 2005/0271277 | A1 * | 12/2005 | Lin .................... | G06K 9/00456 |
| | | | | 382/191 |
| 2014/0079323 | A1 * | 3/2014 | Thapliya ............ | G06K 9/00523 |
| | | | | 382/220 |
| 2017/0068865 | A1 * | 3/2017 | Maalouf ............ | G06K 9/00899 |

(Continued)

OTHER PUBLICATIONS

Liu, S., & Liu, Z. (2017). Multi-Channel CNN-based Object Detection for Enhanced Situation Awareness. arXiv.org, pp. 1-9. (Year: 2017).*

(Continued)

*Primary Examiner* — Amandeep Saini
*Assistant Examiner* — Daniella M. DiGuglielmo
(74) *Attorney, Agent, or Firm* — Ronald Krosky

(57) ABSTRACT

Various embodiments are described that relate to classification of an unknown object. A time series signal associated with an unknown object can be obtained from a sensor. The time series signal can be subjected to a transform set, such as a Fourier transform and a discrete cosine transform, to produce a transform outcome. Based, at least in part, on the transform outcome, the unknown object can be classified.

17 Claims, 11 Drawing Sheets

(56) References Cited

U.S. PATENT DOCUMENTS

2017/0309174 A1* 10/2017 Gonzales .............. G08G 1/042
2019/0251402 A1*  8/2019 Godwin, IV ......... G06N 3/0454
2020/0302589 A1*  9/2020 Maurin ................ G06K 9/6267
2020/0387797 A1* 12/2020 Ryan ..................... G06N 3/088

OTHER PUBLICATIONS

Roy, A.C., Houssin, K., Uddin, P., Mamun, A.A., Afjal, M.I., Nitu, & A.M. (2019). Detection and Classification of Geometric Shape Objects for Industrial Applications. ResearchGate, pp. 11-19. (Year: 2019).*

* cited by examiner

UNKNOWN OBJECT CLASSIFICATION THROUGH SIGNAL TRANSFORM SET

GOVERNMENT INTEREST

The innovation described herein may be manufactured, used, imported, sold, and licensed by or for the Government of the United States of America without the payment of any royalty thereon or therefor.

BACKGROUND

Cameras can enable still pictures and/or video to be captured, which can collectively be referred to as images. A viewer of the image can appreciate various aspects. In one example, a tourist can capture an image of a family member in front of a monument. When viewing the image, the tourist can be able to identify the family member and monument. However, other aspects of the image may be unknown or unidentifiable to the viewer.

SUMMARY

In one embodiment, an unknown object classification system that is at least partially hardware can comprise a reception component, a transform component, and a classification component. The reception component can be configured to receive a time series signal associated with an unknown object, with the time series signal supplying information on a color. The transform component can be configured to perform a transform set upon the time series signal to produce a transform result set. The classification component can be configured to classify the unknown object based, at least in part, on the transform result set.

In another embodiment, an unknown object classification system that is at least partially hardware can comprise a reception component configured to receive a time series signal associated with an unknown object, with the time series signal supplying information on a color. The system can also comprise a transform component configured to perform a transform set upon the time series signal to produce a transform result set. The system can additionally comprise a classification component configured to classify the unknown object based, at least in part, on the transform result set. The transform set can comprise a first transform and a second transform and the transform result set can comprise a first transform result and a second transform result. The first transform can be a Fourier transform that produces a Fourier transform result that functions as the first transform result and the second transform can be a discrete cosine transform that produces a discrete cosine transform result that functions as the second transform result. The time series signal can be a first time series signal, the color can be a first color, and the transform result set can be a first transform result set. The reception component can be configured to receive a second time series signal associated with the unknown object, with the second time series signal supplying information on a second color. The transform component can be configured to perform the transform set upon the second time series signal to produce a second transform result set. The classification component can be configured to classify the unknown object based, at least in part, on the first transform result set and the second transform result set, where the second color is different from the first color.

In yet another embodiment, an unknown object classification system that is at least partially hardware can comprise a reception component configured to receive a time series signal associated with an unknown object, with the time series signal supplying information on a color, such as gray. The system can also comprise a transform component configured to perform a transform set upon the time series signal to produce a transform result set. The system can further comprise a classification component configured to classify the unknown object based, at least in part, on the transform result set. The transform set can comprise a first transform and a second transform and the transform result set can comprise a first transform result and a second transform result. The first transform can be a Fourier transform that produces a Fourier transform result that functions as the first transform result and the second transform can be a discrete cosine transform that produces a discrete cosine transform result that functions as the second transform result.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

Figure 1:
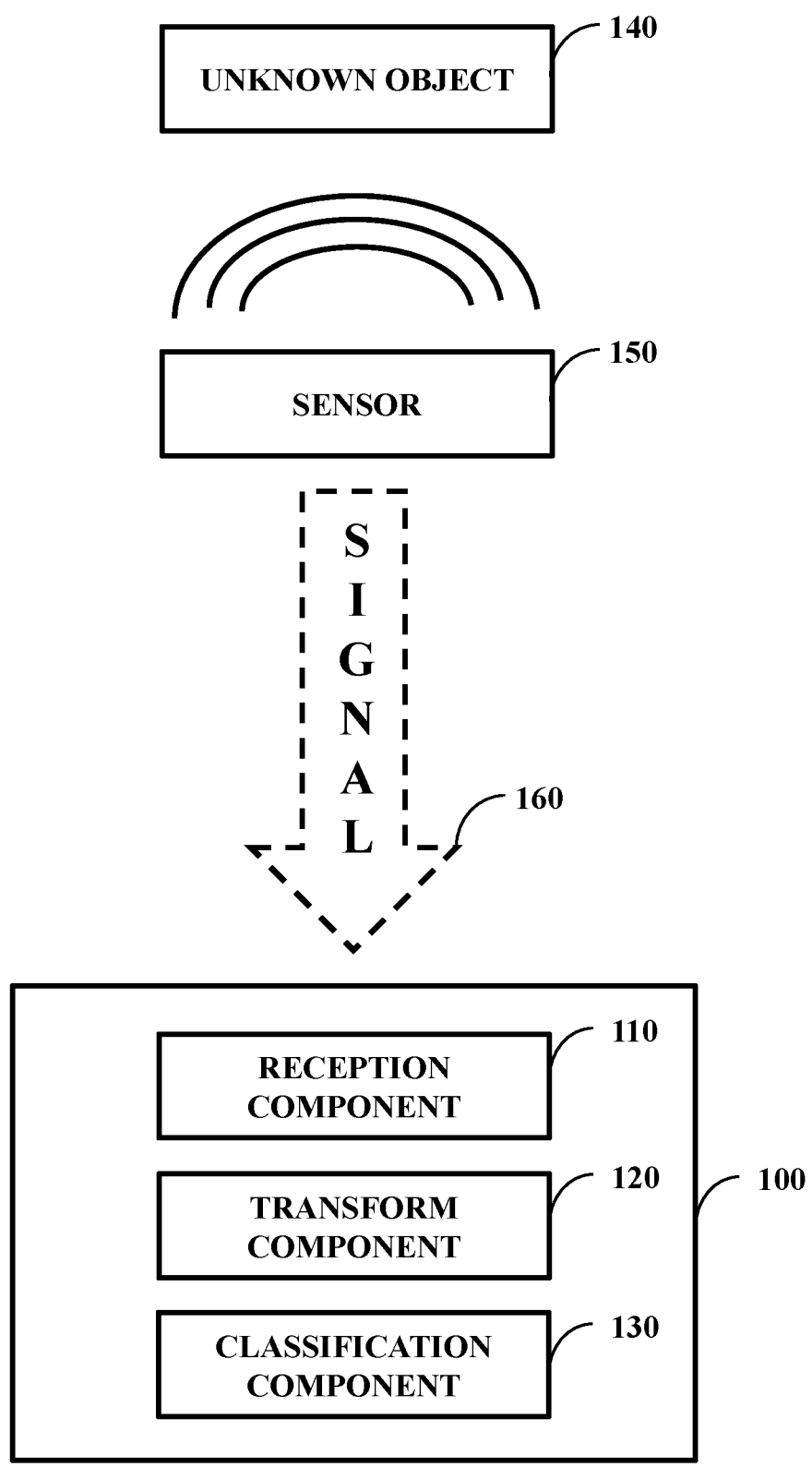
FIG. 1 illustrates one embodiment of a system comprising a reception component, a transform component, and a classification component.

Figures can be referred to collectively. In one example, a reference to "FIG. 2" can include reference to both FIG. 2A and FIG. 2B.

DETAILED DESCRIPTION

A device can employ a classifier to classify an unknown object. The classifier can process the signal by applying various transforms to the signal, such as a discrete cosine transform and a Fourier transform. A processor can employ the results of these transforms to classify the unknown object. Example employment of these results can include comparing the results against one another in cross-correlation, against expectation in auto-correlation, and with a known standard in reference-correlation.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 comprising a reception component 110, a transform component 120, and a classification component 130. The system 100 can be used in a vast array of circumstances. One example circumstance is that of bird monitoring. This example will be used throughout the specification to help explain various aspects. It is to be appreciated by one of ordinary skill in the art that aspects disclosed herein can be used in other areas outside of bird monitoring.

In one example, a camera can be employed to capture images of a bird sanctuary. This example bird sanctuary can have a number of known birds and be open-netted (open air with netting to protect the known birds). However, the netting could rip allowing unknown birds in, including predatory birds to the known birds. When the camera captures an image with an unknown object 140, the system 100 determine if the unknown object 140 is one of the known birds or an outside bird.

The camera can function as a sensor 150 that captures the image. The image can be sent as a signal 160 to the system 100. The signal 160 can be or can include a time series signal that is associated with the unknown object 140, here an unknown bird. The reception component 110 can be configured to receive the time series signal 150 associated with the unknown object 140, with the time series signal supplying information on a color.

In one example, the sensor 150 is a black-and-white camera and therefore the captured color is gray. The reception component 110 can receive the signal 160 and perform initial processing, including extraction of the time series signal.

The transform component 120 can be configured to perform a transform set upon the time series signal to produce a transform result set. In one example, the transforms set comprises a first transform to produce a first transform result and a second transform set to produce a second transform result. An implementation of this example can be a Fourier transform that produces a Fourier transform result and a discrete cosine transform that produces a discrete cosine transform result.

The classification component 130 can be configured to classify the unknown object 140 based, at least in part, on the transform result set. In classifying the unknown object 140, the classification component can perform various correlations. In one embodiment, the transform results are compared against one or more standards to determine the classification (e.g., compare the Fourier transform result against a Fourier transform standard set and compare the discrete cosine transform result against a discrete cosine transform standard set). In another embodiment, transform results are compared against one another to determine the classification (e.g., compare the Fourier transform result against the discrete cosine transform result).

Consider the following example for operation of the system 100. The sensor 150 can capture an image of the bird sanctuary and transfer the image as the signal 160 to the reception component 110. The reception component 110 can receive the signal 160 and the transform component 120 can subject the signal 160 to the transform set. The classification component 130 can identify the presence of the unknown object 140 and determine if this unknown object 140 is a threat.

As an example of this, the system 100 can determine that the unknown object 140 exists in the image. The system 100 can have two trained examples of unknown birds—a Columbidae (non-predatory bird) and a Northern Shrike (predatory bird). These two bird types can have associated signals and associated transform results.

In one embodiment, the system 100 can function on a closest operation. As an example, the classification component 130 can compare the Fourier transform result against a Fourier transform result standard set of a Columbidae Fourier transform result standard and a Northern Shrike Fourier transform result standard and determine that the unknown object 140 is more likely the Columbidae (e.g., a dove or pigeon). The classification component 130 can compare the discrete cosine transform result against a discrete cosine transform result standard set of a Columbidae discrete cosine transform result standard and a Northern Shrike discrete cosine transform result standard and determine that the unknown object 140 is more likely the Columbidae. However, the Fourier transform result and the discrete cosine transform result can be compared to one another with this indicating the unknown object 140 being more likely a Northern Shrike. Since two indicators point to a Columbidae and one indicates a Northern Shrike, then the unknown object 140 can be classified as a Columbidae.

In one embodiment, the system 100 can function a conservative operation. Using the same scenario as the last paragraph, since one indicator indicates a Northern Shrike, then the classification component 130 can classify the unknown object 140 as a Northern Shrike. This can be because any indication of a predatory bird should classify the unknown object 140 as such.

The system 100 can comprise a notification component configured to produce a notification based, at least in part, on the classification. In one example, the notification component can shine a red light when the unknown object is classified as a Northern Shrike and shine a yellow light when the unknown object is classified as a Columbidae. In another example, the notification component can shine a red light when the unknown object is classified as a Northern Shrike and shine no light when the unknown object is classified as a Columbidae.

The time series signal 160 can communicate a variety of information. Example information can include size, speed (e.g., of wings flapping), shape, sound, and other information. This information can be employed by the system 100 in classifying the unknown object 140.

Figure 2A:
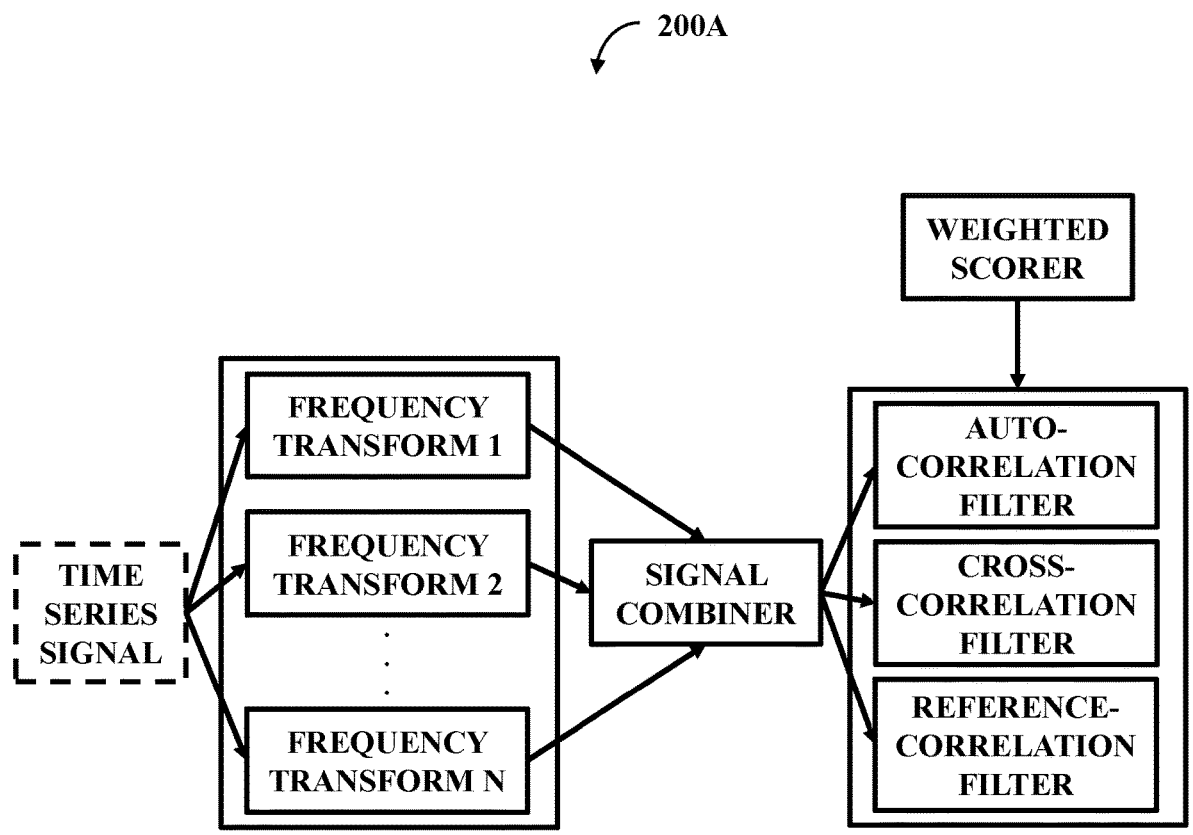
FIG. 2A illustrates one embodiment of an environment functioning with a time series signal.
Figure 2B:
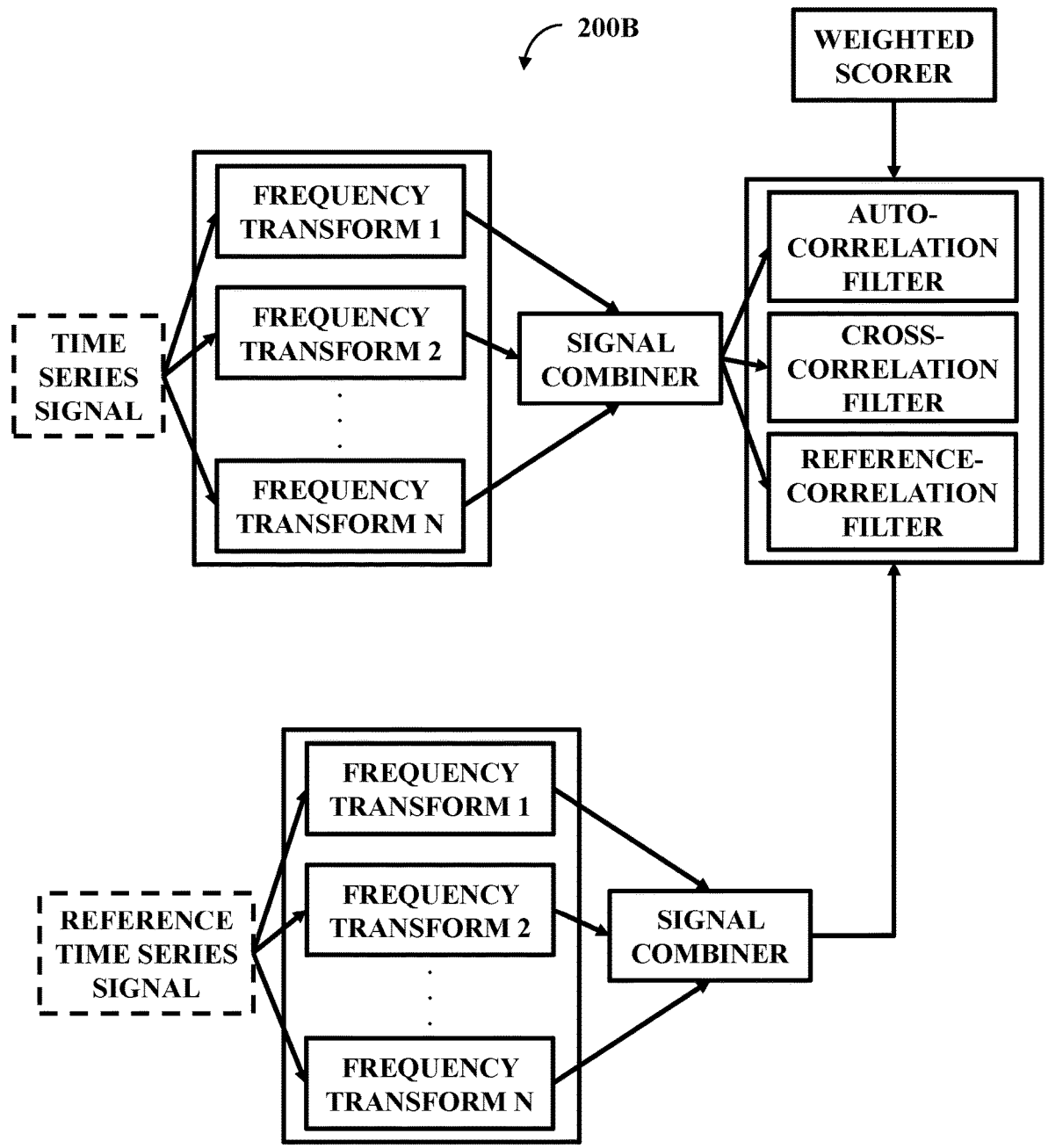
FIG. 2B illustrates one embodiment of an environment functioning with the time series signal and a reference time series signal.

FIG. 2A illustrates one embodiment of an environment 200A functioning with a time series signal. FIG. 2B illustrates one embodiment of an environment 200B functioning with the time series signal and a reference time series signal. The environment 200A can be for when the camera uses a single color (e.g., gray for black-and-white images) and the environment 200B can be for when the camera uses multiple colors (e.g., red, blue, and green for color images).

The environments 200A and 200B can be limited resource environments. These limited resource environments can use frequency transforms for shape detection and pattern recognition using a neural network for high noise signatures. In one embodiment, the neural network is a shallow neural network (e.g., less than five layers, such as one layer).

The environments 200A and 200B can find predetermined shapes and patterns in the time series signal. This can be done even though these shapes and patterns may not be obvious due to random and process noise. Similarly, exact shapes and patterns found in the time series signal may not have been available during training, but shapes and patterns in the time series signal that are similar may have been and this similarity can be exploited to classify the unknown object 140 of FIG. 1. This can lead to hidden signal being found in the timer series signal, such as without using spectrograms and/or wavelets.

Looking at the environment 200A, the time series signal can be sensed by the sensor 150 of FIG. 1 and received by the reception component 110 of FIG. 1 (e.g., the reception component 110 is the sensor 150). A frequency transform bank (e.g., retained by and/or part of the transform component 120 of FIG. 1) can have N number of transforms that relate the time domain to the frequency domain. The transform component 120 of FIG. 1 can include a signal combiner that forms transform results into a single matrix. The classification component 130 of FIG. 1 can be configured to more easily process the transform results if they are in a single matrix.

A filter bank can be employed by or be part of the classification component 130 of FIG. 1 to perform various filtering. This can include an auto-correlation filter, a cross-correlation filter, and a reference correlation filter. Auto-correlation can be correlation of the single matrix against the time series signal. Cross-correlation can be correlation of the one transform result against another (e.g., with a Fourier transform and a discrete cosine transform, this can result in a 4×1 cross-correlation matrix). Reference correlation can be comparing the single matrix against what is known in a database (e.g., a matrix example for a Columbidae and a matrix example for a Northern Shrike to see which one the single matrix is more similar to).

Different transforms and different correlation outputs can be given different weights, such as unequal weights. A weight component (e.g., embodied by the weighted scorer) can be configured to apply a first weight to the first transform result and apply a second weight to the second transform result. This can include applying weight the transform results themselves (e.g., giving the Fourier transform result more weight than the discrete cosine transform result) as well as applying weights to correlations based on the results (e.g., giving the auto-correlation filter output more weight than the cross-correlation filter output).

The classification component 130 of FIG. 1 can configured to classify the unknown object based, at least in part, on the first transform result with the first weight applied and on the second transform result with the second weight applied. The classification component 130 of FIG. 1 can be configured to use non-transform results as part of the classification. In one example, the classification component 130 of FIG. 1 can be configured to compare the time series signal against a time series signal standard set to classify the unknown object. In this, the time series signal itself before being subjected to the transform set can be employed in classifying the unknown object.

While the environment 200A illustrates a single color scenario (e.g., grey for black- and white), the environment 200B illustrates a multi-color scenario. While the environment 200B illustrates two iterations—one for a time series signal and one for a reference time series signal—more iterations can occur, such as three iterations for red, blue, and green. In one example, the red signal can be designated the reference time series signal and the blue and green can be designated (non-reference) time series signals. However, the environment 200B can function without a reference time series signal and the three functioning as (non-reference) time series signals.

The reception component 110 of FIG. 1 can receive the red time series signal, the blue time series signal, and the green time series signal. The transform component 120 of FIG. 1 can subject these three signals to the transform set. The filter bank can filter the results of the transform set. This can be isolated filtering (e.g., comparing the red signal transform result against the red time series signal) or comingled filtering (e.g., comparing the red signal transform result against the green signal transform result and/or the blue time series signal).

The system 100 of FIG. 1 can function with additional components, such as an analysis component and a notification component. The analysis component can be configured to analyze the classification of the unknown object to produce an analysis result. The notification component can be configured to cause an output of a notification based, at least in part, on the analysis result.

Returning to the bird example, the classification component 130 of FIG. 1 can classify the unknown object as a Columbidae, a Northern Shrike, or a still unknown. The analysis component can identify which one bird is classified and based on the bird classification, different notifications can take place. Since the Columbidae is not threatening, the notification component can engage a yellow light telling a caretaker there is a breach, but no threat is active. The notification component can engage an orange light when the classification is still unknown after operation of the system 100 of FIG. 1; this indicates a possible threat and a breach. The notification component can engage a red light and a sound buzzer when the classification is the Northern Shrike since that is a known threat to the bird sanctuary.

Figure 3:
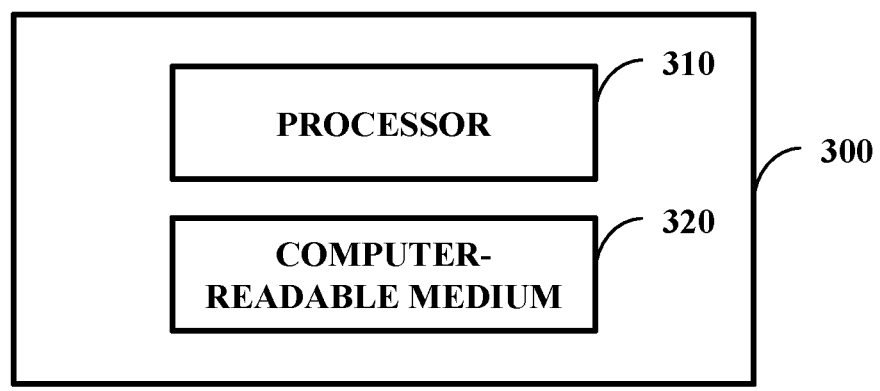
FIG. 3 illustrates one embodiment of a system comprising a processor and a computer-readable medium.

FIG. 3 illustrates one embodiment of a system 300 comprising a processor 310 (e.g., a general purpose processor or a processor specifically designed for performing a functionality disclosed herein) and a computer-readable medium 320 (e.g., non-transitory computer-readable medium). In one embodiment, the computer-readable medium 320 is communicatively coupled to the processor 310 and stores a command set executable by the processor 310 to facilitate operation of at least one component disclosed herein (e.g., the transform component 120 of FIG. 1 and the weight component discussed above). In one embodiment, at least one component disclosed herein (e.g., the analysis component and the notification component discussed above) can be implemented, at least in part, by way of non-software, such as implemented as hardware by way of the system 300. In one embodiment, the computer-readable medium 320 is configured to store processor-executable instructions that when executed by the processor 310, cause the processor 310 to perform a method disclosed herein (e.g., the methods 400-1000 addressed below).

Figure 4:
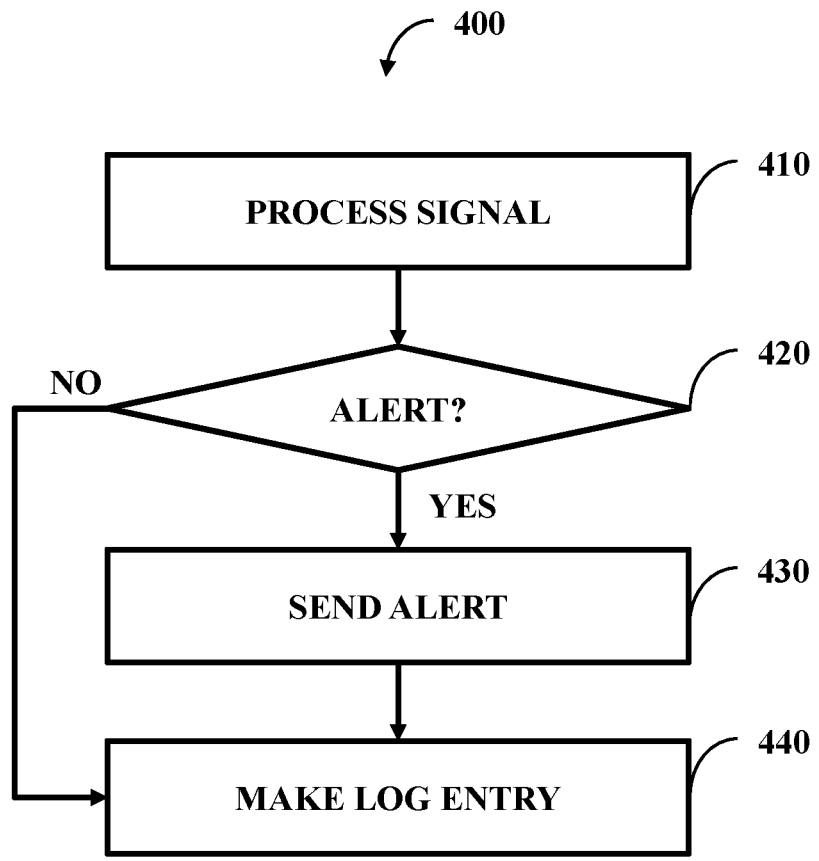
FIG. 4 illustrates one embodiment of a method comprising four actions.

FIG. 4 illustrates one embodiment of a method 400 comprising four actions 410-440. At 410, a signal can be processed, such as the time series signal and/or reference time series signal as described with the environments 200A and 200B of FIGS. 2A and 2B, respectively. At 420, a check can be performed, such as collectively by the analysis component and notification component, on if an alert should be sent out based on the classification of the unknown object. If the alert should be sent, then the method 400 can continue to 430 to send such an alert. After the alert is sent or if no alter should be sent, a log entry can be made at 440.

A trainer component can be configured to use the log entry to train other devices or improve the system 100 of FIG. 1. In one example, returning to the bird discussion, the classification component 130 of FIG. 1 can be unable to classify the unknown object. A keeper can look, in response to the orange light, and determine for herself that the unknown object is a third kind of bird (e.g., a Hummingbird). The trainer component can train logic such that this unknown signal is associated with the third kind of bird such that in the future the third kind of bird can be identified. In one embodiment, this training occurs after deployment of the system 100 of FIG. 1.

Figure 5:
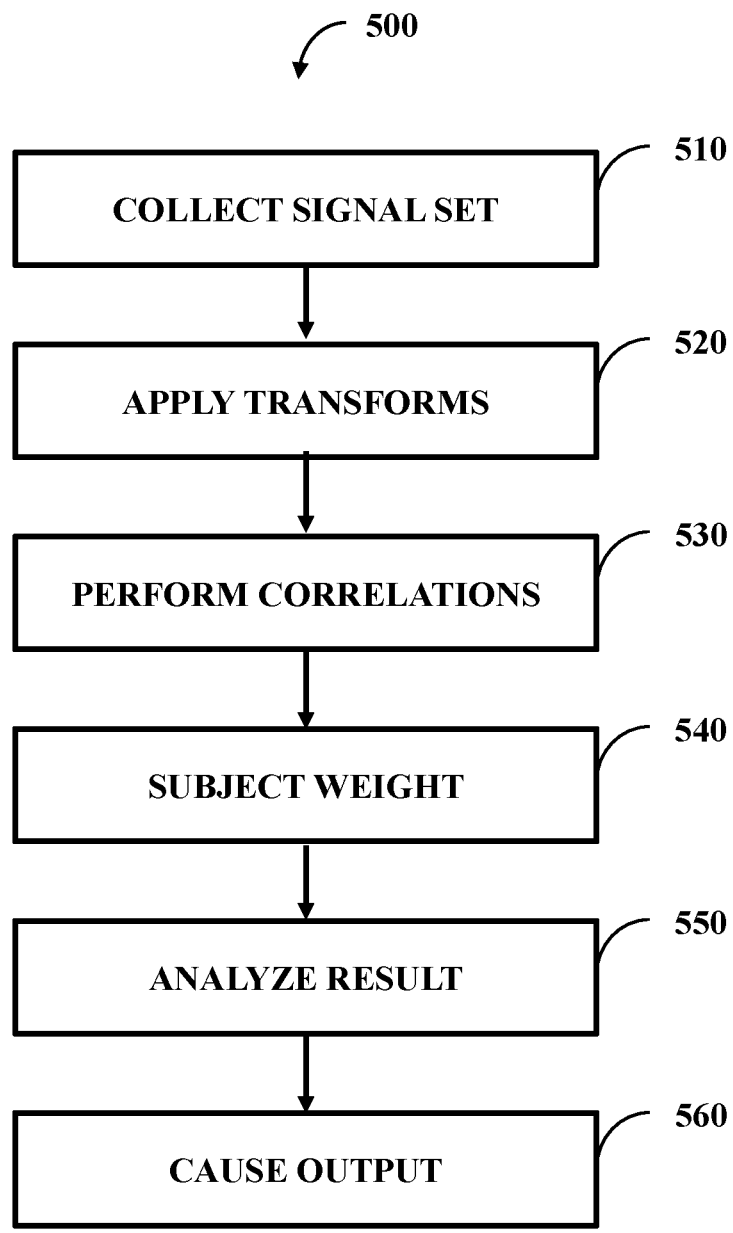
FIG. 5 illustrates one embodiment of a method comprising six actions.

FIG. 5 illustrates one embodiment of a method 500 comprising six actions 510-560. At 510, a signal set can be collected. In one example, four signals can be collected for this signal set—a red time series signal, a green time series signal, a blue time series signal, and a reference time series signal. At 520, the transform bank of FIG. 2 can be subjected to these four signals and, at 530, the filter bank of FIG. 2 can correlate the results of the transform bank (e.g., correlating the Fourier transform result of the green time series signal against the discrete cosine transform result of the red time series signal).

At 540, the outcomes of the filter bank of FIG. 2 can be weighted relative to one another. The amount to weigh different outcomes can be preprogramed and/or adaptively learned during deployment. At 550, the weighted outcomes can be aggregated together and analyzed. This analysis can classify the unknown object and determine if the classification should result in an output along with what that output should be. If it is determined that an output is appropriate, then at 560 the output can occur.

Figure 6:
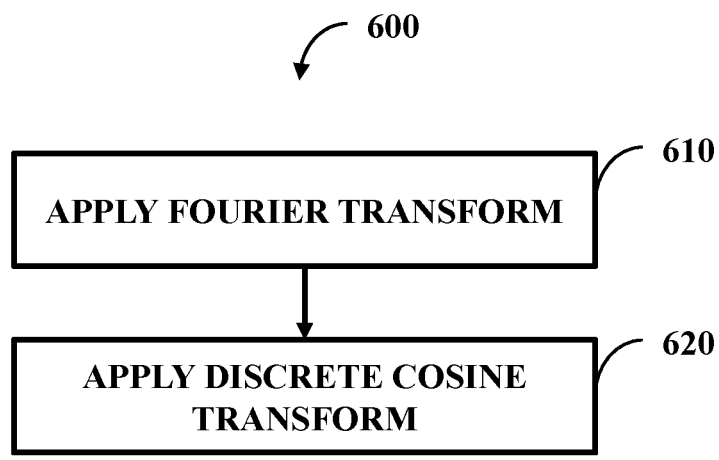
FIG. 6 illustrates one embodiment of a method comprising two actions.

FIG. 6 illustrates one embodiment of a method 600 comprising two actions 610-620. At 610, a Fourier transform can be applied to a time series signal set. At 620, a discrete cosine transform can be applied to the timer series signal set. The actions 610 and 620 can function as the action 520 of FIG. 5.

Figure 7:
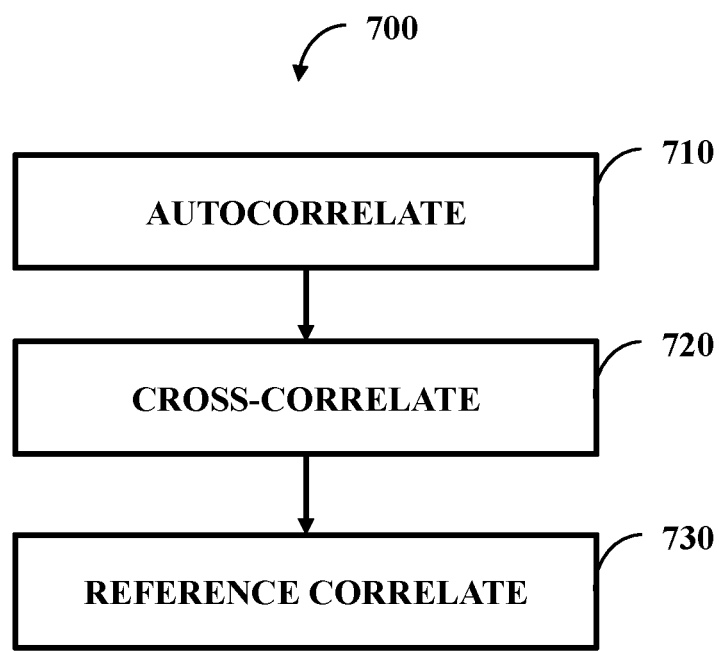
FIG. 7 illustrates one embodiment of a method comprising three actions.

FIG. 7 illustrates one embodiment of a method 700 comprising three actions 710-730. At 710, auto-correlation can occur (e.g., correlating a transform result against a time series signal from which the transform result is derived). At 720, cross-correlation can occur (e.g., correlating a Fourier transform result against another Fourier transform result or comparing a Fourier transform result against a discrete cosine transform result of the same or a different color). At 730, reference-correlation can occur (e.g., correlating a transform result based on a database sample). The actions 710-730 can function as the action 530 of FIG. 5.

Figure 8:
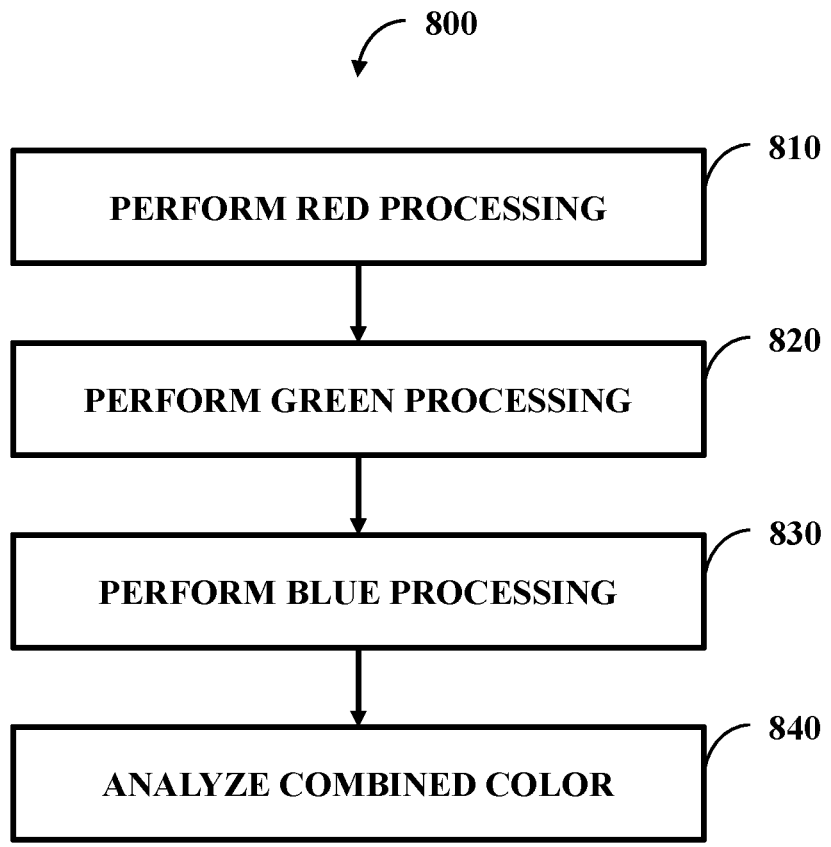
FIG. 8 illustrates one embodiment of a method comprising four actions.

FIG. 8 illustrates one embodiment of a method 800 comprising four actions 810-840. A red signal (e.g., designated first color), a green signal (e.g., designated second signal), and a blue signal (e.g., designated third signal) can be processed (e.g., be subjected to transforms). At 810 the red signal can be processed, at 820 the green signal can be processed, and at 830 the blue signal can be processed. In one embodiment, actions 810, 820, and 830 occur concurrently. At 840, the results of the processing can be combined and analyzed (e.g., combined by the signal combiner of FIG. 2 and analyzed by the filter bank of FIG. 2).

Figure 9:
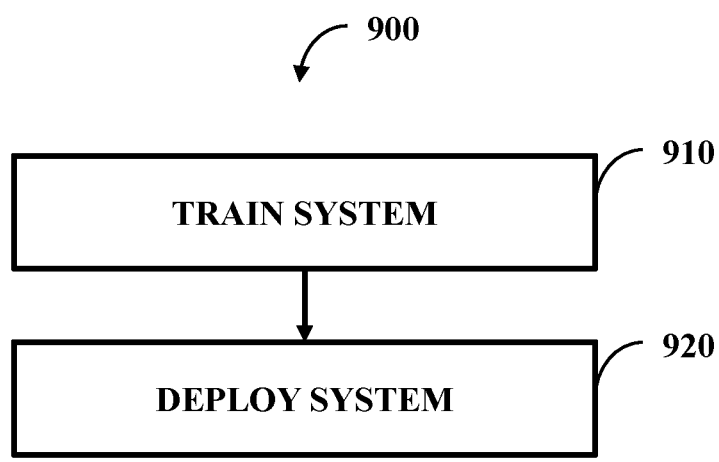
FIG. 9 illustrates one embodiment of a method comprising two actions.

FIG. 9 illustrates one embodiment of a method 900 comprising two actions 910-920. At 910, a system can be trained, such as the system 100 of FIG. 1. Returning to the bird examples, the classification component 130 of FIG. 1 can be provided various information related to the shape and/or movement pattern of a Columbidae and the shape and/or movement pattern a Northern Shrike. In one example, five reference shapes can be given for each, with these reference shapes comprising a sample time series signal, a sample Fourier transform result, and a sample discrete transform result. The correlation component 130 of FIG. 1 can employ these reference shapes during reference-correlation. The trained system can be deployed at 920.

Figure 10:
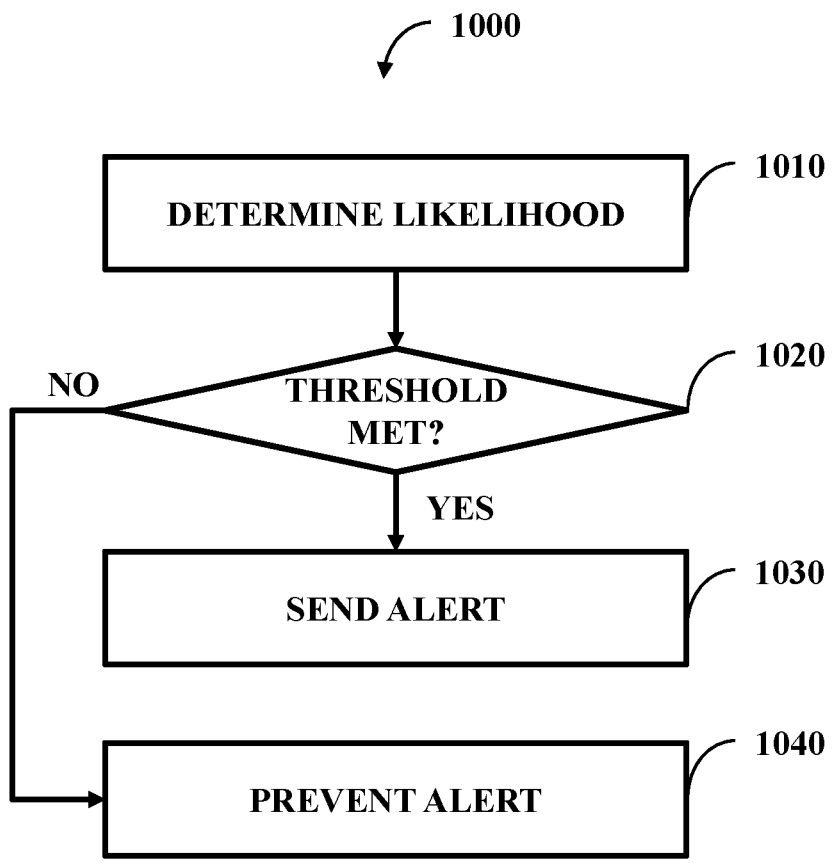
FIG. 10 illustrates one embodiment of a method comprising four actions.

FIG. 10 illustrates one embodiment of a method 1000 comprising four actions 1010-1040. At 1010, a likelihood can be determined. In one example of likelihood determination, correlation filters (e.g., of the environments 200A and 200B of FIG. 2) can be used to see if the time series signal is likely to contain desired shapes or patterns (e.g., shapes or patterns of the Columbidae or the Northern Shrike) along with weighted scoring (e.g., taking the output matrix from the signal combiner and scoring the probability that the time series signal contains the desired pattern). At 1020, a check can be if a likelihood threshold is met. In one example, the determination that the unknown object is 51% likely a Northern Shrike and 49% likely a Columbidae. If the threshold is surpassing 50%, then the unknown object can be classified as the Northern Shrike and since this is a predator an alert can be sent out at 1030. If the threshold were surpassing 66.67%, then neither classification can be made and no alter would be sent out at 1040.

While the bird example was used throughout, it is to be appreciated by one of ordinary skill in the art that aspects disclosed herein can be used in a wide variety of other technological fields. For example, object tracking in sports broadcasts (e.g., following a baseball in air), missile identification for aircraft countermeasures, or medical diagnosis (e.g., classifying growths as benign or malignant).

While the methods disclosed herein are shown and described as a series of blocks, it is to be appreciated by one of ordinary skill in the art that the methods are not restricted by the order of the blocks, as some blocks can take place in different orders. In one example, for the method 900 of FIG. 9, the system 100 of FIG. 1 can be trained after being deployed (e.g., with a real world failure example where a Columbidae was classified as a Northern Shrike). Similarly, a block can operate concurrently with at least one other block (e.g., actions 810, 820, and 830 of FIG. 8 can occur simultaneously with overlap).

What is claimed is:

1. An unknown object classification system that is at least partially hardware, the system comprising:
    a reception component configured to receive a time series signal associated with an unknown object, with the time series signal supplying information on a color;
    a transform component configured to perform a transform set upon the time series signal to produce a transform result set; and
    a classification component configured to classify the unknown object based, at least in part, on the transform result set,
    where the transform set comprises a first transform and a second transform,
    where the transform result set comprises a first transform result and a second transform result,
    where the first transform is a Fourier transform that produces a Fourier transform result that functions as the first transform result,
    where the second transform is a discrete cosine transform that produces a discrete cosine transform result that functions as the second transform result, and
    where the classification component is configured to compare the Fourier transform result against the discrete cosine transform result to classify the unknown object.

2. The system of claim 1,
    where the classification component is configured to compare the Fourier transform result against a Fourier transform standard set to classify the unknown object, and
    where the classification component is configured to compare the discrete cosine transform result against a discrete cosine transform standard set to classify the unknown object.

3. The system of claim 1, comprising:
    a weight component configured to apply a first weight to the first transform result and apply a second weight to the second transform result,
    where the classification component is configured to classify the unknown object based, at least in part, on the first transform result with the first weight applied and on the second transform result with the second weight applied, and
    where the first weight and the second weight are unequal.

4. The system of claim 1,
    where the time series signal is a first time series signal,
    where the color is a first color,
    where the transform result set is a first transform result set,
    where the reception component is configured to receive a second time series signal associated with the unknown object, with the second time series signal supplying information on a second color,
    where the transform component is configured to perform the transform set upon the second time series signal to produce a second transform result set, and
    where the second color is different from the first color.

5. The system of claim 4,
    where the reception component is configured to receive a third time series signal associated with the unknown object, with the time series signal supplying information on a third color,
    where the transform component is configured to perform the transform set upon the third time series signal to produce a third transform result set,
    where the classification component is configured to classify the unknown object based, at least in part, on the first transform result set, the second transform result set, and the third transform set,
    where the first color is red,
    where the second color is blue, and
    where the third color is green.

6. The system of claim 1,
    where the color is gray.

7. The system of claim 1,
    where the classification component is configured to compare the time series signal against a time series signal standard set to classify the unknown object.

8. The system of claim 1,
    where the classification component is configured to classify the unknown object through employment of a shallow neural network of one layer.

9. The system of claim 1, comprising:
    an analysis component configured to analyze the classification of the unknown object to produce an analysis result; and
    a notification component configured to cause output of a notification based, at least in part, on the analysis result.

10. An unknown object classification system that is at least partially hardware, the system comprising:
    a reception component configured to receive a first time series signal associated with an unknown object, with the first time series signal supplying information on a first color of red, configured to receive a second time series signal associated with the unknown object, with the second time series signal supplying information on a second color of blue, and configured to receive a third time series signal associated with the unknown object, with the third time series signal supplying information on a third color of green,
    a transform component configured to perform a transform set upon the first time series signal to produce a first transform result set, configured to perform the transform set upon the second time series signal to produce a second transform result set, and configured to perform the transform set upon the third time series signal to produce a third transform result set; and
    a classification component configured to produce a classification of the unknown object based, at least in part, on the first transform result set, the second transform result, and the third transform result,
    where the transform set comprises a first transform and a second transform,
    where the first transform is a Fourier transform that produces a Fourier transform result that functions as the first transform result,
    where the second transform is a discrete cosine transform that produces a discrete cosine transform result that functions as the second transform result,
    where the classification component is configured to compare the Fourier transform result against a Fourier transform standard set to classify the unknown object in production of the classification, where the classification component is configured to compare the Fourier transform result against the discrete cosine transform result in production of the classification of the unknown object, and where the classification is a shape-based classification.

11. The system of claim 10,
where the classification component is configured to compare the discrete cosine transform result against a discrete cosine transform standard set in production of the classification of the unknown object and
where the classification is the shape-based classification along with being a pattern-based classification.

12. The system of claim 11, comprising:
a weight component configured to apply a first weight to the first transform result, configured to apply a second weight to the second transform result, and configured to apply a third weight to the third transform result,
where the classification component configured to produce the classification of the unknown object based, at least in part, on the first transform result with the first weight applied, on the second transform result with the second weight applied, and on the third transform result with the third weight applied,
where the first weight and the second weight are unequal,
where the first weight and the third weight are unequal, and
where the second weight and the third weight are unequal.

13. The system of claim 12, comprising:
an analysis component configured to analyze the classification of the unknown object to produce an analysis result; and
a notification component configured to cause output of a notification based, at least in part, on the analysis result;
where the classification component is configured to compare the time series signal against a time series signal standard set to classify the unknown object and
where the classification component is configured to classify the unknown object through employment of a shallow neural network of one layer.

14. An unknown object classification system that is at least partially hardware, the system comprising:
a reception component configured to receive a time series signal associated with an unknown object, with the time series signal supplying information on a color;
a transform component configured to perform a transform set upon the time series signal to produce a transform result set;
and a classification component configured to classify the unknown object based, at least in part, on the transform result set,
where the transform set comprises a first transform and a second transform,
where the transform result set comprises a first transform result and a second transform result,
where the first transform is a Fourier transform that produces a Fourier transform result that functions as the first transform result,
where the second transform is a discrete cosine transform that produces a discrete cosine transform result that functions as the second transform result,
where the color is gray,
where the classification component is configured to compare the Fourier transform result against a Fourier transform standard set to classify the unknown object,
where the classification component is configured to compare the discrete cosine transform result against a discrete cosine transform standard set to classify the unknown object,
and where the classification component is configured to compare the Fourier transform result against the discrete cosine transform result to classify the unknown object.

15. The system of claim 14, comprising:
a weight component configured to apply a first weight to the first transform result and apply a second weight to the second transform result,
where the classification component configured to classify the unknown object based, at least in part, on the first transform result with the first weight applied and on the second transform result with the second weight applied, and
where the first weight and the second weight are unequal.

16. The system of claim 15, comprising:
an analysis component configured to analyze the classification of the unknown object to produce an analysis result; and
a notification component configured to cause output of a notification based, at least in part, on the analysis result,
where the classification component is configured to classify the unknown object through employment of a shallow neural network of one layer.

17. The system of claim 16,
where the classification is, at least in part, a shape: based classification,
where the classification is, at least in part, a pattern: based classification, and
where the classification component is configured to compare the time series signal against a time series signal standard set to classify the unknown object.

* * * * *